(12) United States Patent
Hsieh

(10) Patent No.: US 9,898,021 B2
(45) Date of Patent: Feb. 20, 2018

(54) DUAL-MODE REGULATOR CIRCUIT

(71) Applicant: NUVOTON TECHNOLOGY CORPORATION, Hsinchu (TW)

(72) Inventor: Chung-Ming Hsieh, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 0 days.

(21) Appl. No.: 15/367,677

(22) Filed: Dec. 2, 2016

(65) Prior Publication Data

US 2017/0160756 A1 Jun. 8, 2017

(30) Foreign Application Priority Data

Dec. 8, 2015 (TW) .............................. 104141198 A

(51) Int. Cl.
 *G05F 1/56* (2006.01)
 *H02M 3/158* (2006.01)
 *H02M 3/155* (2006.01)

(52) U.S. Cl.
 CPC .............. *G05F 1/56* (2013.01); *H02M 3/155* (2013.01); *H02M 3/158* (2013.01); *H02M 3/1584* (2013.01)

(58) Field of Classification Search
 CPC ......... G05F 1/56; H02M 3/158; H02M 3/155; H02M 3/1584
 See application file for complete search history.

(56) References Cited

U.S. PATENT DOCUMENTS

| | | | | |
|---|---|---|---|---|
| 6,972,546 B2* | 12/2005 | Kobayashi | .......... | H02M 3/1588 323/225 |
| 7,397,151 B2* | 7/2008 | Ishino | ................. | H02M 3/1584 307/150 |
| 9,154,029 B2* | 10/2015 | Wang | .................... | H02M 3/155 |
| 2011/0273235 A1* | 11/2011 | Chen | .................... | H03F 1/0266 330/295 |

* cited by examiner

*Primary Examiner* — Emily P Pham
(74) *Attorney, Agent, or Firm* — Muncy, Geissler, Olds & Lowe, P.C.

(57) ABSTRACT

The present disclosure illustrates a dual-mode regulator circuit comprising: a first output terminal; a second output terminal; a switching regulator circuit coupled to the first output terminal and comprising a first transistor coupled between the first output terminal and ground; a linear regulator circuit coupled to the second output terminal and comprising a second transistor coupled between the second output terminal and a power source; a detection circuit configured to turn on the first transistor in order to connect the first output terminal to ground, turn on the second transistor in order to connect the second output terminal to the power source, and then generate a detection signal indicating whether an inductor is connected between the first and second output terminals; and a logic circuit configured to activate the switching regulator circuit or the linear regulator circuit according to the detection signal.

9 Claims, 7 Drawing Sheets

DUAL-MODE REGULATOR CIRCUIT

CROSS-REFERENCE TO RELATED APPLICATION

This application claims the benefit of Taiwan Patent Application No. 104141198, filed Dec. 8, 2015 at the Taiwan Intellectual Property Office, the disclosure of which is incorporated herein in its entirety by reference.

BACKGROUND OF THE INVENTION

1. Field of the Invention

The present invention relates to a dual-mode regulator circuit, more particularly to a dual-mode regulator circuit capable of quickly determining the type of connected external circuit according to a voltage at an output terminal of the dual-mode regulator circuit, and then switching between a linear regulator mode and a switching regulator mode according to the determination made.

2. Description of the Related Art

In recent years, in order to meet the demand for low static power, conventional linear regulators used in microcontroller units (MCUs), or other similar systems on a chip (SOCs) and embedded systems are gradually being replaced by switching regulators.

The switching regulator is far more efficient than the linear regulator. For example, when used in a power system with 3.3V input voltage and 1.2V output voltage, the switching regulator can achieve a power conversion efficiency higher than 80%. In contrast, the linear regulator has a maximum efficiency of only 36%, which gives an efficiency difference between the two kinds of regulator of more than 44%.

While the switching regulator has a significant advantage with its high efficiency, it also has certain drawbacks. The switching regulator functions by continuously switching the power component on and off during operation, resulting in the voltage level of a node in the circuit to continuously switch between 0 volts and the voltage of the power source, and therefore a large current passes through the node. So, due to the rapid switching of the voltage level, significant bouncing may occur at the node. Another problem is that the switching regulator may interfere with other circuits through electromagnetic interference (EMI), and so electromagnetic compatibility (EMC) might have to be addressed.

Nowadays, more and more MCUs have switching regulators and linear regulators integrated on the same chip, so that the user can decide which regulator to use. Nevertheless, when powering-on, the system may fail to decide whether the connected external circuit is suitable for the switching-type or the linear-type regulator.

SUMMARY OF THE INVENTION

Therefore, it is a primary objective of the present invention to provide a dual-mode regulator circuit. The dual-mode regulator circuit of the present invention includes a first output terminal, a second output terminal, a switching regulator circuit, a linear regulator circuit, a detection circuit and a logic circuit. The switching regulator circuit is coupled to the first output terminal and includes a first transistor coupled between the first output terminal and ground. The linear regulator circuit is coupled to the second output terminal and includes a second transistor coupled between the second output terminal and a power source. The detection circuit is configured to turn on the first transistor in order to connect the first output terminal to ground, turn on the second transistor in order to connect the second output terminal to the power source, and then generate a detection signal indicating whether an inductor is connected between the first and second output terminals, and The detection circuit is configured to activate the switching regulator circuit or the linear regulator circuit according to the detection signal.

Preferably, the detection circuit includes a logic circuit and a comparator. The logic circuit is coupled with the comparator, the switching regulator circuit and the linear regulator circuit. The comparator includes a first input terminal coupled to the first output terminal, and a second input terminal configured to receive a reference voltage or a voltage of the second output terminal. When a voltage of the first input terminal is lower than a voltage of the second input terminal, the comparator outputs the detection signal indicating that no inductor is connected between the first output terminal and the second output terminal. Then, the logic circuit activates the linear regulator circuit to output voltage to the second output terminal according to the detection signal.

Preferably, when the voltage of the first input terminal is not lower than the voltage of the second input terminal, the comparator outputs the detection signal indicating that the inductor is connected between the first output terminal and the second output terminal. Then, the logic circuit activates the switching regulator circuit to output voltage to the second output terminal via the inductor according to the detection signal.

Preferably, the switching regulator circuit further includes a third transistor connected between the power source and the first output terminal.

Preferably, the first transistor is an n-channel transistor, and the second and third transistors are p-channel transistors.

Preferably, when the first output terminal and the second output terminal are disconnected, then the logic circuit activates the linear regulator circuit to output voltage to the second output terminal.

Preferably, the dual-mode regulator circuit further includes a selection circuit, coupled between the second transistor and the third transistor, and including a control terminal coupled to the logic circuit. When the linear regulator circuit is activated to output voltage, the logic circuit controls the selection circuit in order to connect the second transistor and the third transistor in parallel.

Preferably, the selection circuit includes a first switch connected between a gate of the first transistor and a gate of the second transistor, a second switch connected between an error amplifier of the linear regulator circuit and the gate of the second transistor, a third switch connected between the first output terminal and a drain of the second transistor, and a fourth switch connected between the drain of the second transistor and the second output terminal.

Preferably, the second output terminal is electrically connected to an electric load.

BRIEF DESCRIPTION OF THE DRAWINGS

The structure, operating principle and advantages of the present invention will be described and illustrated in detail by way of various embodiments together with the accompanying drawings, which are described as follows.

DETAILED DESCRIPTION OF THE PREFERRED EMBODIMENTS

The technical characteristics, implementation and advantages of the present invention are further explained in the following detailed description of the preferred embodiments, which refer to the accompanying drawings.

Figure 1:
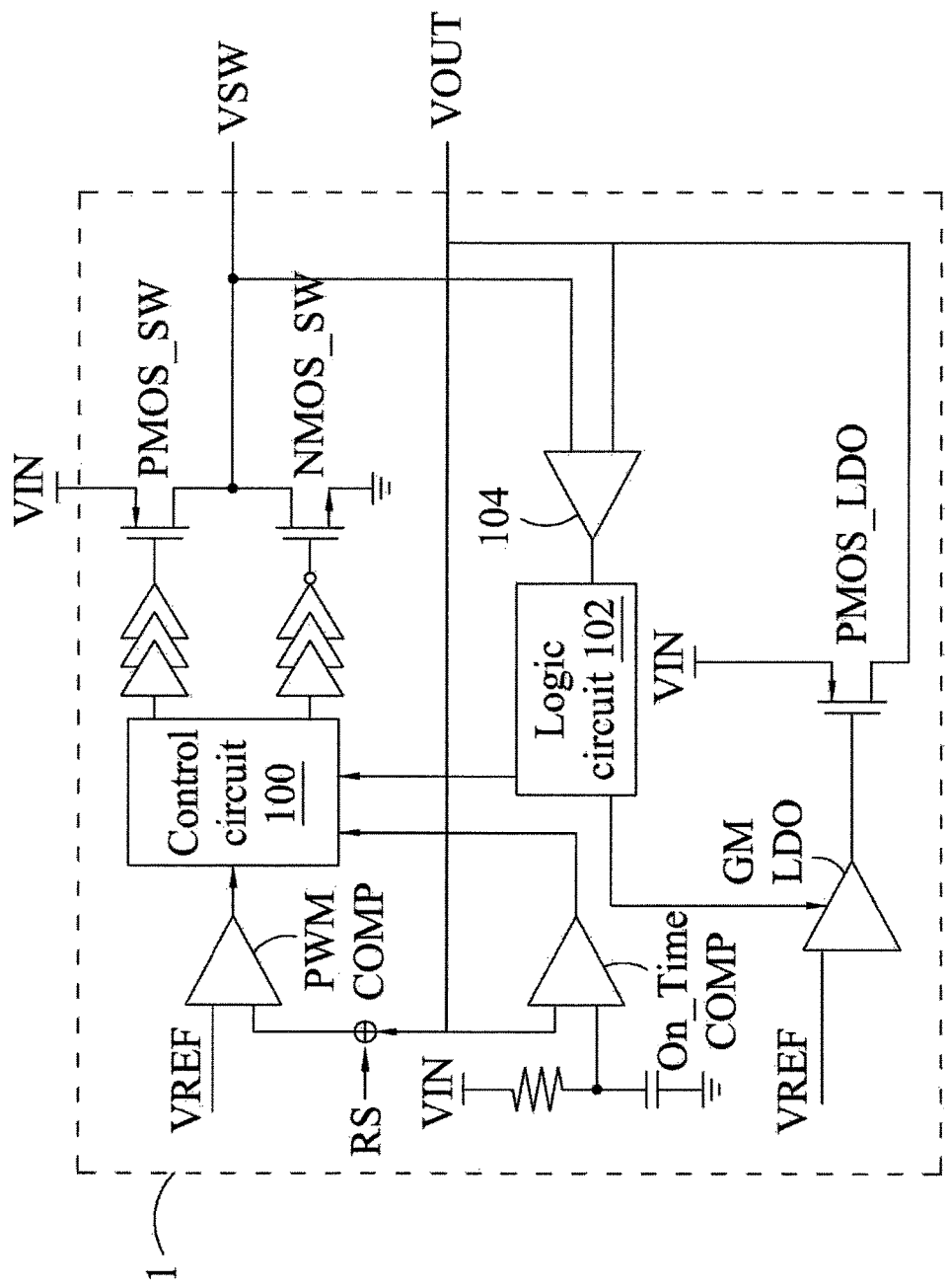
FIG. 1 is a circuit diagram of a first embodiment of a dual-mode regulator circuit of the present invention.

The following refers to FIG. 1, which is a circuit diagram of a first embodiment of a dual-mode regulator circuit of the present invention. The dual-mode regulator circuit 1 includes a switching regulator circuit and a linear regulator circuit. The switching regulator circuit includes a pulse-width modulation (PWM) comparator PWM COMP, a control circuit 100, an on-time comparator On_Time COMP, a ripple synthesizer RS and a p-channel transistor PMOS_SW and an n-channel transistor NMOS_SW. The transistor PMOS_SW has a source coupled to an input voltage source VIN, and a drain coupled to a source of the transistor NMOS_SW and a first output terminal VSW. The transistor NMOS_SW has a drain coupled to ground. The PWM comparator PWM_COMP has a first input terminal coupled to a reference voltage VREF, and a second input terminal coupled to a second output terminal VOUT, so that the control circuit 100 can separately turn on/off the transistors PMOS_SW and NMOS_SW in response to any change in the voltage at the second output terminal VOUT. With this particular regulator architecture, the output voltage is continuously adjusted up and down to be slightly higher or lower than a set point. This type of regulator architecture is called a "ripple regulator" or an "on-time controller".

In the present invention, the control circuit 100 may be a PWM/PFM logic control circuit capable of switching between a pulse-frequency modulation scheme and a pulse-width modulation scheme under a pre-determined current threshold, in order to improve the power conversion efficiency under a light load. In the pulse-frequency modulation scheme, the duty cycle of the pulse signal is constant but the frequency of the pulse signal is modulated for the purpose of regulating the voltage VOUT. Furthermore, the on-time comparator On_Time COMP can be used to trigger the control circuit 100 via a control terminal of the control circuit 100, so as to control the on/off durations of the transistors PMOS_SW and NMOS_SW in the switching regulator circuit.

The linear regulator circuit of the dual-mode regulator circuit 1 of the present invention includes a transistor PMOS_LDO and an error amplifier GM LDO configured to control the transistor PMOS_LDO. As shown in FIG. 1, the transistor PMOS_LDO is a p-channel transistor, and has a source coupled to the input voltage source VIN and a drain coupled to the second output terminal VOUT. The error amplifier GM LDO is configured to adjust the gate voltage of the transistor PMOS_LDO in order to regulate the output voltage; when the output voltage decreases because of a heavier load, then the error amplifier GM LDO decreases the gate voltage of the transistor PMOS_LDO with respect to the source of the transistor PMOS_LDO, such that the transistor PMOS_LDO enters a conductive state and the second output voltage VOUT is pulled to match the input voltage source VIN. The linear regulator circuit has the advantages of providing accurate and noiseless output voltage, and of quickly responding to changes in the load. Furthermore, the linear regulator circuit has a simple architecture and a lower operating cost.

However, in the prior art, dual-mode regulator circuits are unable to detect whether the connected external circuit is in a form suitable for the use of a switching regulator circuit or a linear regulator circuit. Also, for some conventional dual-mode regulators, the choice of incorrect regulator circuit type for a particular external circuit may cause excessive current that damages the dual-mode regulator circuit. Therefore, the dual-mode regulator circuit 1 of the present invention is provided with a detection circuit to detect whether an inductor is connected between the first output terminal VSW and the second output terminal VOUT. The detection circuit includes a logic circuit 102 and a comparator 104. The comparator 104 has a first input terminal coupled to the first output terminal VSW, and a second input terminal coupled to the second output terminal VOUT. The comparator 104 is configured to compare the voltages of the first input terminal and the second input terminal. The logic circuit 102 is coupled to an output terminal of the comparator 104 to receive the signal output from the comparator 104. The logic circuit 102 is further coupled to the control circuit 100 and to the error amplifier GM LDO, and is configured to control the operation mode of the dual-mode regulator circuit 1 according to the output signal of the comparator 104. The detailed operation scheme is described hereinafter with reference to the accompanying drawings.

Figure 2A:
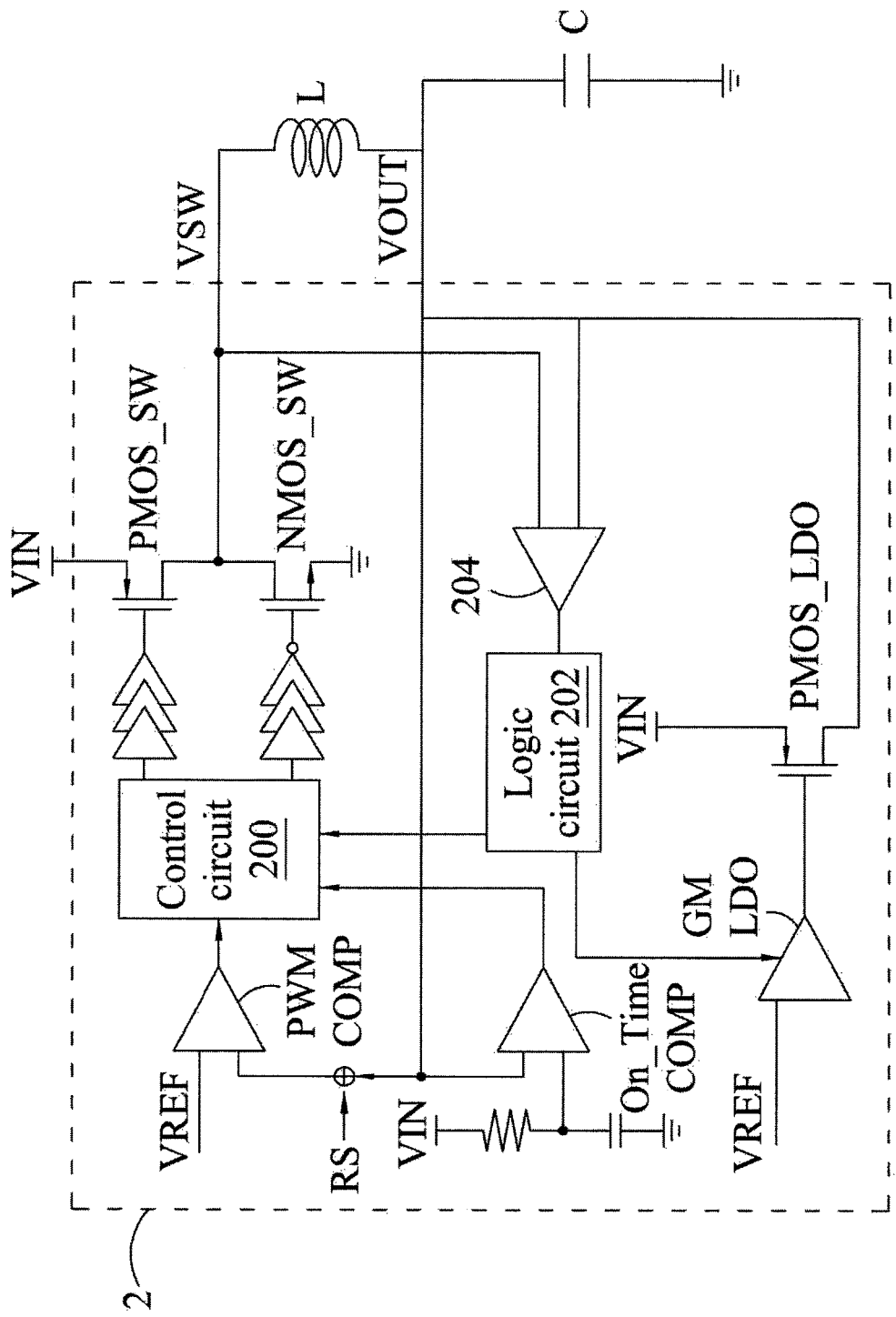
FIGS. 2A and 2B are circuit diagrams of a second embodiment of the dual-mode regulator circuit of the present invention in a switching mode and a linear regulator mode respectively.
Figure 2B:
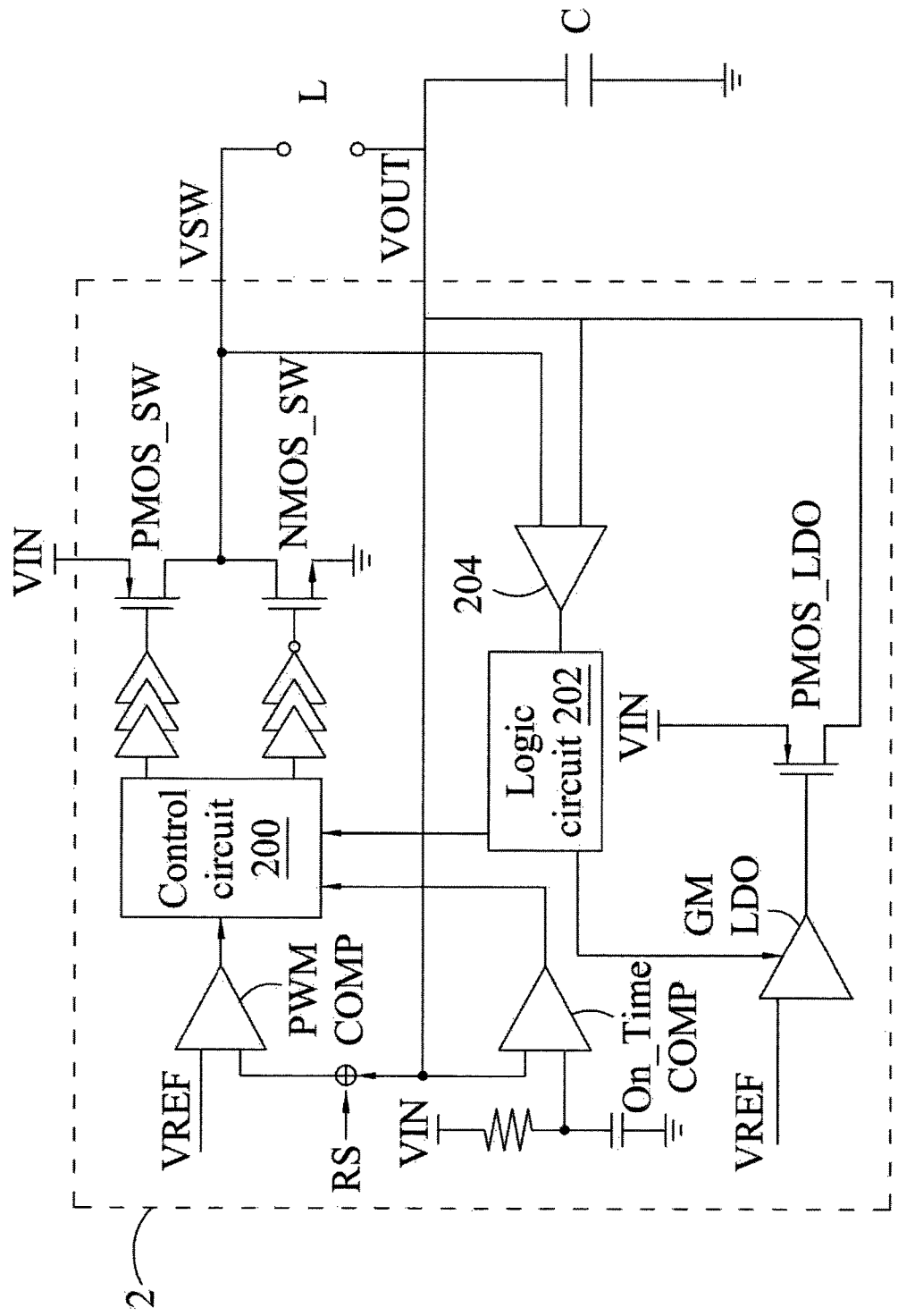

The following refers to FIGS. 2A and 2B, which show circuit diagrams of a second embodiment of the dual-mode regulator circuit of the present invention in a switching mode and linear regulator mode respectively. As shown in FIGS. 2A and 2B, the architecture of the dual-mode regulator circuit 2 is the same as that of the dual-mode regulator circuit 1 of the first embodiment, shown in FIG. 1. In order to activate the switching regulator circuit of the dual-mode regulator circuit 2, an inductor L is connected between the first output terminal VSW and the second output terminal VOUT, and a capacitor C is connected between the second output terminal VOUT and ground.

Before the dual-mode regulator circuit 2 outputs voltage to the first output terminal VSW and the second output terminal VOUT, the logic circuit 202 controls the control circuit 200 to turn on the transistor NMOS_SW and turn off the transistor PMOS_SW for a short period of time, so that the voltage level of the first output terminal VSW drops to ground level. Next, the logic circuit 202 controls the control circuit 200 to turn off both of the transistors NMOS_SW and PMOS_SW, and the first output terminal VSW is kept at ground level. In order to test whether a current can flow from the second output terminal VOUT to the first output terminal VSW, the logic circuit 202 controls the error amplifier GM LDO to turn on the transistor PMOS_LDO, so that the second output terminal VOUT is electrically coupled to the input voltage source VIN via the transistor PMOS_LDO, and the voltage of the second output terminal VOUT increases to the voltage level of the input voltage source VIN.

The inductor L connected between the first output terminal VSW and the second output terminal VOUT causes short-circuiting therebetween. Thus, the voltage level of the first output terminal VSW is equal to the voltage level of the second output terminal VOUT. In response to the same voltage levels of both the first output terminal VSW and the second output terminal VOUT, the comparator 204 outputs a signal to the logic circuit 202, causing the logic circuit 202 to turn off the error amplifier GM LDO and turn on the control circuit 200, so that the dual-mode regulator circuit enters the switching regulator mode. In the switching regulator mode, the control circuit 200 turns on the transistor PMOS_SW and turns off the transistor NMOS_SW, so that the input voltage source VIN provides power to the first output terminal VSW via the transistor PMOS_SW. If the user wants to switch from the switching regulator mode to the linear regulator mode, the user can control the logic circuit 202 to turn on the error amplifier GM LDO and turn off the control circuit 200. In the linear regulator mode, the control circuit 200 turns off both of the transistors PMOS_SW and NMOS_SW, and the error amplifier GM LDO turns on the transistor PMOS_LDO, so that the input voltage source VIN provides power to the second output terminal VOUT via the transistor PMOS_LDO.

Alternately, as shown in FIG. 2B, if there is no inductor L connected between the first output terminal VSW and the second output terminal VOUT, that is, the first output terminal VSW and the second output terminal VOUT are disconnected, then the logic circuit 202 controls the error amplifier GM LDO to turn on the transistor PMOS_LDO, and the input voltage source VIN provides power via the transistor PMOS_LDO to increase the voltage level of the second input terminal VOUT, but the voltage level of the first output terminal VSW stays at ground level because the circuit is open between the first output terminal VSW and the second output terminal VOUT. The voltage difference between the first output terminal VSW and the second output terminal VOUT causes the comparator 204 to output a signal with a different voltage level to the logic circuit 202. In response to the output signal from the comparator 204, the logic circuit 202 turns on the error amplifier GM LDO and turns off the control circuit 200, so that the dual-mode regulator circuit is started in the linear regulator mode. The control circuit 200 turns off both of the transistors PMOS_SW and NMOS_SW, and the error amplifier GM LDO turns on the transistor PMOS_LDO, so that the input voltage source VIN provides power to the second output terminal VOUT via the transistor PMOS_LDO.

Therefore, the dual-mode regulator circuit includes the switching regulator circuit and the linear regulator circuit independent from each other, and can detect the type of the connected external circuit quickly to determine which regulator circuit to start up. Furthermore, the user can safely set up an open circuit between the output terminals or connect an inductor between the output terminals to select the corresponding regulator mode. So, in this way the dual-mode regulator circuit has improved safety.

Figure 3:
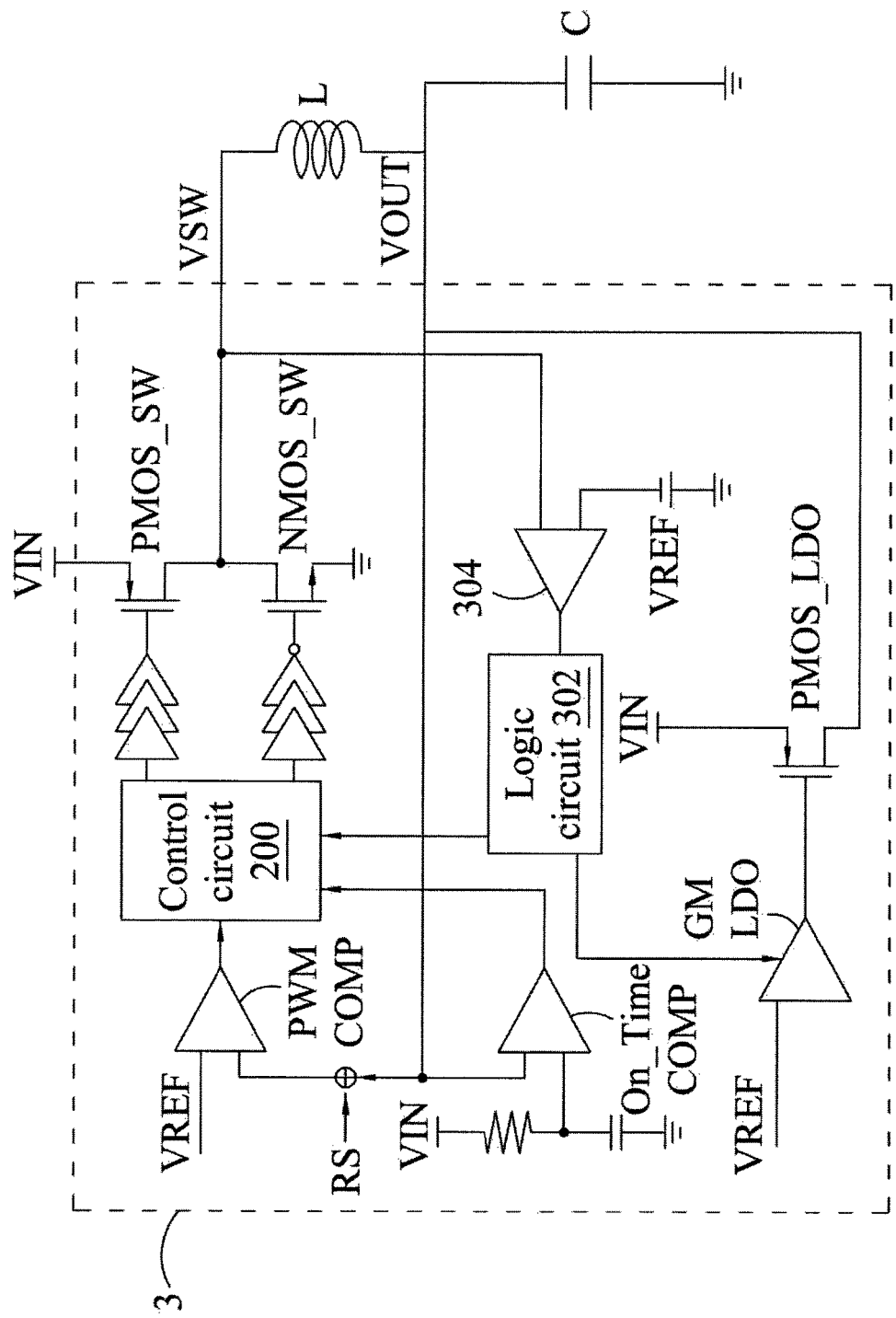
FIG. 3 is a circuit diagram of a third embodiment of the dual-mode regulator circuit of the present invention.

The following refers to FIG. 3, which shows a circuit diagram of a third embodiment of the dual-mode regulator circuit of the present invention. As shown in FIG. 3, the difference between the dual-mode regulator circuit 3 and that of previous embodiments is that, in the dual-mode regulator circuit 3, the second output terminal of the comparator 304 is coupled to another reference voltage VREF, not to the second output terminal VOUT. By means of adjusting the reference voltage VREF, prior to outputting voltage to the first output terminal VSW and the second output terminal VOUT, the dual-mode regulator circuit 3 can detect the difference between the voltage levels of the first output terminal VSW and the second output terminal VOUT, and also detect whether the voltage level of the first output terminal VSW is higher than the reference voltage VREF. If the comparator 304 detects a voltage level of the first output terminal VSW higher than 0 volts, then the dual-mode regulator circuit can determine the type of the connected external circuit in advance without waiting for the voltage level of the first output terminal VSW to increase to the voltage level of the second output terminal VOUT. As a result, the dual-mode regulator circuit 3 can be faster in starting the switching regulator mode.

For example, when the voltage level of the second output terminal VOUT is 1.2V, the reference voltage VREF can be set as 0.6V; while the voltage level of the first output terminal VSW increases to 0.6V, the switching regulator mode of the dual-mode regulator circuit 3 can be started by the logic circuit 302 according to the comparison result of the comparator 304. So, it is not necessary for the dual-mode regulator circuit 3 to wait for the voltage level of the first output terminal VSW to increase to 1.2V.

Figure 4:
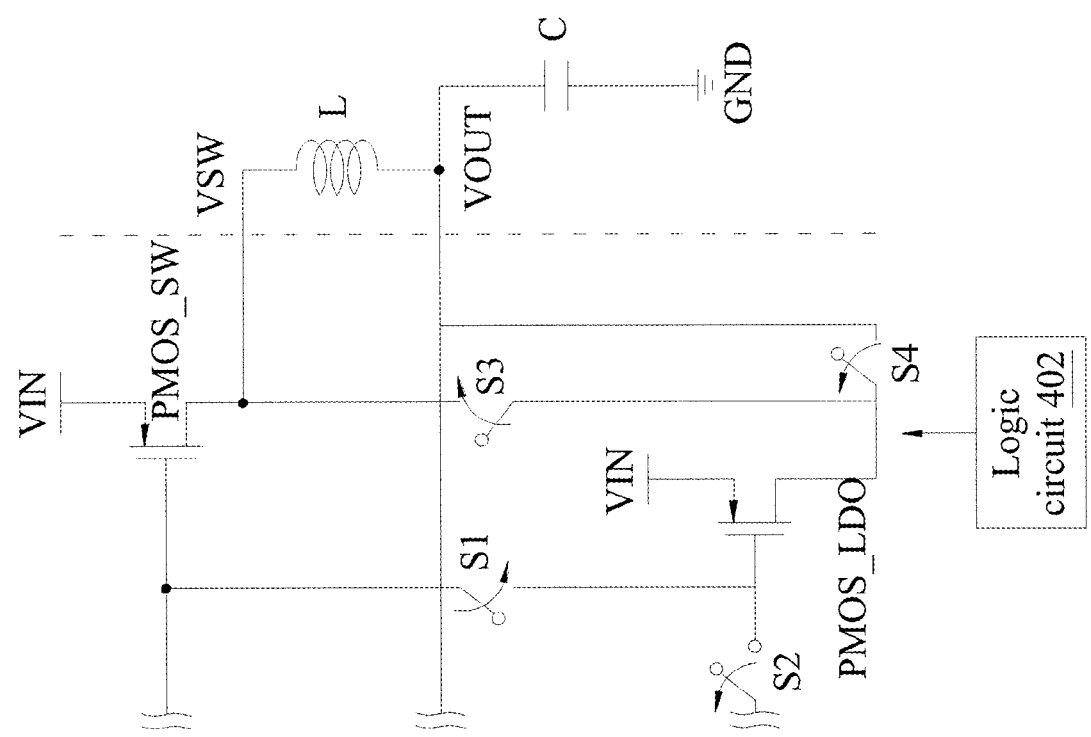
FIG. 4 is a circuit diagram of a fourth embodiment of the dual-mode regulator circuit of the present invention.
Figure 5:
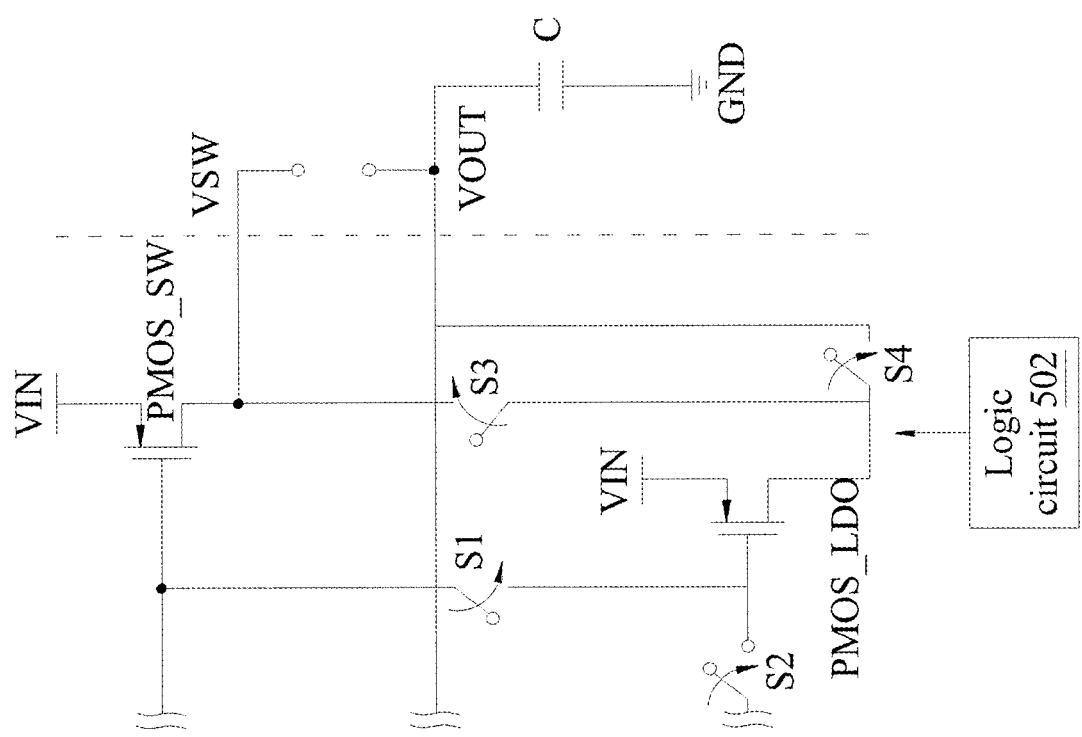
FIG. 5 is a circuit diagram of a fifth embodiment of the dual-mode regulator circuit of the present invention.

The following refers to FIGS. 4 and 5, which respectively show circuit diagrams of the fourth and fifth embodiments of the dual-mode regulator circuit of the present invention. The dual-mode regulator circuits shown in FIGS. 4 and 5 are similar to that of previous embodiments, so detailed descriptions of the same parts are omitted. The difference between the dual-mode regulator circuits shown in FIGS. 4 and 5 and that of the previous embodiments is that each of the dual-mode regulator circuits shown in FIGS. 4 and 5 further includes first to fourth switches S1-S4. The first switch S1 is connected between the gate of the transistor PMOS_SW and the gate of the transistor PMOS_LDO, the second switch S2 is connected between the error amplifier GM LDO and the gate of the transistor PMOS_LDO, the third switch S3 is connected between the first output terminal VSW and the drain of the transistor PMOS_LDO, and the fourth switch S4 is connected between the drain of the transistor PMOS_LDO and the second output terminal VOUT. The logic circuit 402 is further coupled to the control terminals of the first to fourth switches S1-S4, so as to individually turn on/off the first to fourth switches S1-S4. As shown in FIG. 4, when the connected inductor is detected, the dual-mode regulator circuit is able to selectively operate in the switching regulator mode or the linear regulator mode. In the switching regulator mode, the logic circuit 402 turns on the first switch S1 and third switch S3, and turns off the second switch S2 and the fourth switch S4. In this configuration, and from the perspective of the input voltage source VIN and the first output terminal VSW, the transistor PMOS_SW and the transistor PMOS_LDO are connected in parallel, so an equivalent resistor formed by the transistor PMOS_SW and the transistor PMOS_LDO is smaller than the conductive resistance of the transistor PMOS_SW, thereby reducing the voltage drop caused by the conductive resistance. On the other hand, when the dual-mode regulator circuit is switched from the switching regulator mode to the linear regulator mode, the logic circuit 402 turns on the first to fourth switches S1-S4. In this configuration, and from the perspective of the input voltage source VIN and the second output terminal VOUT, the transistor PMOS_SW and the transistor PMOS_LDO are connected in parallel, so the equivalent resistor formed by the transistor PMOS_SW and the transistor PMOS_LDO is smaller than the conductive resistance of the transistor PMOS_LDO, thereby reducing the voltage drop caused by the conductive resistance.

Furthermore, as shown in FIG. 5, when the dual-mode regulator circuit detects the absence of the inductor and therefore only operates in the linear regulator mode, the logic circuit 502 turns on the first to fourth switches S1-S4. In this configuration, and from the perspective of the input voltage source VIN and the second output terminal VOUT, the transistor PMOS_SW and the transistor PMOS_LDO are connected in parallel, so the equivalent resistor formed by the transistor PMOS_SW and the transistor PMOS_LDO is smaller than the conductive resistance of the transistor PMOS_LDO, thereby reducing the voltage drop caused by the conductive resistance.

Figure 6:
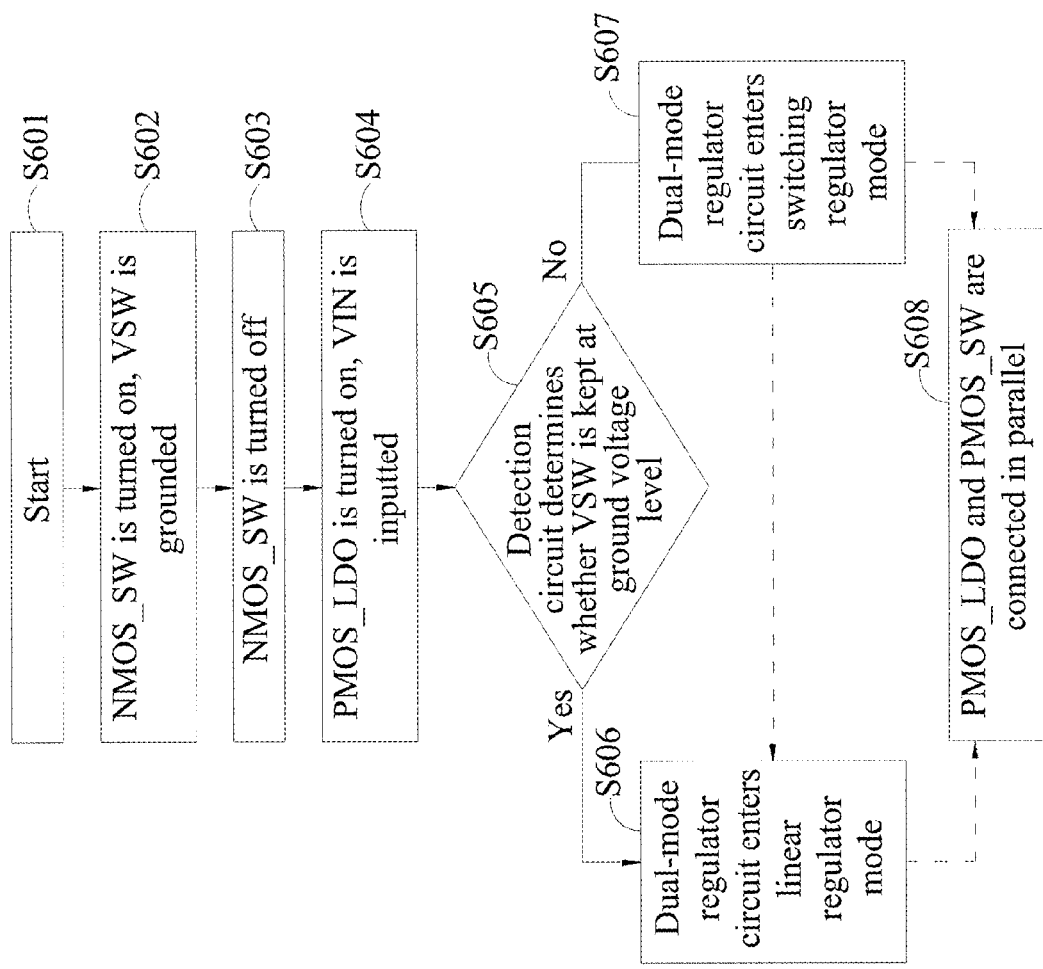
FIG. 6 is a flowchart showing the steps in an operation of the dual-mode regulator circuit of the present invention.

Please refer to FIG. 6, which shows a flowchart with the steps of an operation of the dual-mode regulator circuit of the present invention. The method is adapted to the above described dual-mode regulator circuits and includes the following steps.

In a step S601, the dual-mode regulator circuit is powered on.

In a step S602, the logic circuit turns on the transistor NMOS_SW and turns off the transistor PMOS_SW for a short period of time, so that the voltage level of the first output terminal VSW drops to ground level.

In a step S603, the logic circuit controls the control circuit to turn off the transistor NMOS_SW and the transistor PMOS_SW, and the first output terminal VSW is kept at ground level.

In a step S604, the logic circuit controls the error amplifier to turn on the transistor PMOS_LDO, so that the input voltage source VIN provides power to the second output terminal VOUT via the transistor PMOS_LDO.

In a step S605, the detection circuit detects whether the first output terminal VSW remains at ground voltage level. In the embodiments in particular, the comparator can compare the voltage levels of the first output terminal VSW and the second output terminal VOUT, or compare the voltage level of the first output terminal VSW with the preset reference voltage VREF, to determine whether the first output terminal VSW remains at ground voltage level. If the first output terminal VSW remains at ground voltage level, then this indicates an open circuit between the first output terminal VSW and the second output terminal VOUT, and so the method proceeds to a step S606, where the dual-mode regulator circuit enters the linear regulator mode. If the first output terminal VSW is not at ground voltage level, then this indicates the presence of the inductor, and so the dual-mode regulator circuit can operate in the switching regulator mode or in the linear regulator mode, and the method can proceed to a step S607 of entering the switching regulator mode or to a step S606 of entering the linear regulator mode.

In a step S608, the logic circuit controls a selection circuit to connect the transistor PMOS_LDO and transistor PMOS_SW in parallel. The selection manner has already been described and has been shown in FIGS. 4 and 5, so its detailed description is not repeated here.

To summarize, the dual-mode regulator circuit of the present invention includes the switching regulator circuit and the linear regulator circuit, and is able to detect the presence of the inductor and switch between the switching regulator mode and the linear regulator mode according to the detection result. To start up the linear regulator mode, no external circuit is required to be connected between the first output terminal VSW and the second output terminal VOUT, and the dual-mode regulator circuit completes the detection determination quickly. Furthermore, by using a reference voltage and a selection circuit, the step of switching over to the switching regulator mode can be quicker, and the transistor PMOS_SW or PMOS_LDO in the non-activated regulator circuit can be used to reduce the conductive resistance of the dual-mode regulator circuit, so as to decrease the voltage drop caused by the conductive resistance.

The above description is for the purpose of illustration only and shall not be interpreted in any way to limit the scope, configuration or applicability of the present invention. A person skilled in the art may carry out many changes and modifications in the described embodiments without departing from the spirit and the scope of the present invention, which is intended to be limited only by the appended claims.

What is claimed is:

1. A dual-mode regulator circuit, comprising:
   a first output terminal;
   a second output terminal;
   a switching regulator circuit, coupled to the first output terminal, and comprising a first transistor coupled between the first output terminal and ground;
   a linear regulator circuit, coupled to the second output terminal, and comprising a second transistor coupled between the second output terminal and a power source;
   a detection circuit, configured to turn on the first transistor in order to connect the first output terminal to ground, turn on the second transistor in order to connect the second output terminal to the power source, then generate a detection signal indicating whether an inductor is connected between the first and second output terminals, and then activate the switching regulator circuit or the linear regulator circuit according to the detection signal.

2. The dual-mode regulator circuit according to claim 1, wherein the detection circuit comprises:
   a comparator, comprising a first input terminal coupled to the first output terminal, and a second input terminal configured to receive a reference voltage or a voltage of the second output terminal; and
   a logic circuit, coupled to the comparator, the switching regulator circuit and the linear regulator circuit;
   wherein when a voltage of the first input terminal is lower than a voltage of the second input terminal, the comparator outputs the detection signal indicating that no inductor is connected between the first output terminal and the second output terminal, and then the logic circuit activates the linear regulator circuit to output voltage to the second output terminal according to the detection signal.

3. The dual-mode regulator circuit according to claim 2, wherein when the voltage of the first input terminal is not lower than the voltage of the second input terminal, the comparator outputs the detection signal indicating that the inductor is connected between the first output terminal and the second output terminal, and then the logic circuit activates the switching regulator circuit to output voltage to the second output terminal via the inductor according to the detection signal.

4. The dual-mode regulator circuit according to claim 2, wherein the switching regulator circuit further comprises a third transistor connected between the power source and the first output terminal.

5. The dual-mode regulator circuit according to claim 4, wherein the first transistor is an n-channel transistor, and the second and third transistors are p-channel transistors.

6. The dual-mode regulator circuit according to claim 5, wherein when the first output terminal and the second output terminal are disconnected, then the logic circuit activates the linear regulator circuit to output voltage to the second output terminal.

7. The dual-mode regulator circuit according to claim 4, further comprising a selection circuit coupled between the second transistor and the third transistor and comprising a control terminal coupled to the logic circuit, and when the linear regulator circuit is activated to output voltage, the logic circuit controls the selection circuit in order to connect the second transistor and the third transistor in parallel.

8. The dual-mode regulator circuit according to claim 7, wherein the selection circuit comprises a first switch connected between a gate of the first transistor and a gate of the second transistor, a second switch connected between an error amplifier of the linear regulator circuit and the gate of the second transistor, a third switch connected between the first output terminal and a drain of the second transistor, and a fourth switch connected between the drain of the second transistor and the second output terminal.

9. The dual-mode regulator circuit according to claim 1, wherein the second output terminal is electrically connected to an electric load.

\* \* \* \* \*